(12) United States Patent
Ito et al.

(10) Patent No.: US 11,217,782 B2
(45) Date of Patent: Jan. 4, 2022

(54) ENERGY STORAGE DEVICE

(71) Applicant: GS Yuasa International Ltd., Kyoto (JP)

(72) Inventors: Shota Ito, Kyoto (JP); Tomonori Kako, Kyoto (JP); Kazuki Kawaguchi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 49 days.

(21) Appl. No.: 16/090,727

(22) PCT Filed: Apr. 3, 2017

(86) PCT No.: PCT/JP2017/013893
§ 371 (c)(1),
(2) Date: Oct. 2, 2018

(87) PCT Pub. No.: WO2017/175697
PCT Pub. Date: Oct. 12, 2017

(65) Prior Publication Data
US 2019/0115584 A1 Apr. 18, 2019

(30) Foreign Application Priority Data

Apr. 4, 2016 (JP) .............................. JP2016-075259

(51) Int. Cl.
H01M 4/02 (2006.01)
H01M 4/36 (2006.01)
(Continued)

(52) U.S. Cl.
CPC ............ H01M 4/131 (2013.01); H01G 11/24 (2013.01); H01G 11/86 (2013.01); H01M 4/04 (2013.01);
(Continued)

(58) Field of Classification Search
None
See application file for complete search history.

(56) References Cited

U.S. PATENT DOCUMENTS

2004/0110063 A1    6/2004  Uchitomi
2009/0117022 A1*   5/2009  Nuspl ..................... C01B 25/37
                                                          423/306
(Continued)

FOREIGN PATENT DOCUMENTS

JP          09129230        5/1997
JP          11329432 A2    11/1999
(Continued)

OTHER PUBLICATIONS

Extended European Search Report (EESR) dated Sep. 16, 2019 issued in the corresponding European patent application No. 17779075.5.

(Continued)

Primary Examiner — Yoshitoshi Takeuchi
(74) Attorney, Agent, or Firm — Rankin, Hill & Clark LLP

(57) ABSTRACT

An energy storage device includes a positive electrode having a positive active material layer containing an active material in the form of particles. The positive active material layer contains primary particles of the active material and secondary particles formed by aggregation of a plurality of primary particles. The proportion of primary particles relative to all particles of the active material in the positive active material layer is 5% or more and 40% or less. An method for producing an energy storage device includes preparing a positive electrode having a positive active material layer by forming a positive active material layer from a composite containing at least secondary particles of an active material, and assembling an energy storage device using the prepared positive electrode. In the preparation of (Continued)

the positive electrode, the positive active material layer is pressed to deagglomerate some of the secondary particles into primary particles, and the proportion of primary particles relative to all particles of the active material in the positive active material layer is adjusted to 5% or more and 40% or less.

3 Claims, 9 Drawing Sheets

(51) Int. Cl.
*H01M 4/131* (2010.01)
*H01G 11/24* (2013.01)
*H01G 11/86* (2013.01)
*H01M 4/04* (2006.01)
*H01M 4/525* (2010.01)
*H01M 10/0525* (2010.01)
*H01M 4/1397* (2010.01)
*H01M 4/1391* (2010.01)

(52) U.S. Cl.
CPC ....... *H01M 4/0435* (2013.01); *H01M 4/1391* (2013.01); *H01M 4/1397* (2013.01); *H01M 4/366* (2013.01); *H01M 4/525* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2012/0321956 A1 | 12/2012 | Kawahashi |
| 2013/0209889 A1 | 8/2013 | Takahata |
| 2014/0342230 A1 | 11/2014 | Watanabe |
| 2014/0377659 A1* | 12/2014 | Oljaca .................. H01M 4/505 429/221 |
| 2015/0263341 A1 | 9/2015 | Kato |
| 2015/0325838 A1 | 11/2015 | Tamaki |

FOREIGN PATENT DOCUMENTS

| | | | |
|---|---|---|---|
| JP | 2000133246 | A2 | 5/2000 |
| JP | 2003157831 | A2 | 5/2003 |
| JP | 2003221236 | A2 | 8/2003 |
| JP | 2004241242 | A2 | 8/2004 |
| JP | 2008115075 | A2 | 5/2008 |
| JP | 2009238587 | A2 | 10/2009 |
| JP | 2011134535 | A2 | 7/2011 |
| JP | 2012253009 | A2 | 12/2012 |
| JP | 5522844 | B2 | 6/2014 |
| JP | 5630669 | B2 | 11/2014 |
| JP | 2015185354 | A2 | 10/2015 |
| KR | 2016-0021278 | A | 2/2016 |
| WO | 2011108720 | A1 | 9/2011 |
| WO | 2013046711 | A1 | 4/2013 |
| WO | 2014103558 | A1 | 7/2014 |
| WO | 2014104234 | A1 | 7/2014 |
| WO | 2014205215 | A2 | 12/2014 |

OTHER PUBLICATIONS

International Search Report (ISR) dated Jul. 4, 2017 filed in PCT/JP2017/013893.

* cited by examiner

ENERGY STORAGE DEVICE

TECHNICAL FIELD

The present invention relates to an energy storage device, such as a lithium ion secondary battery.

BACKGROUND ART

Conventionally, a lithium secondary battery is known in which an electrode assembly, which includes a positive electrode and a negative electrode, and a nonaqueous electrolytic solution are housed in a battery case.

As a battery of this type, a battery is known in which the positive electrode contains positive active material particles having a hollow structure including a shell part, which is composed of a layered lithium transition metal oxide, and a hollow part, which is formed in the interior of the shell part (Patent Document 1). In the battery described in Patent Document 1, the major axis of primary particles of the lithium transition metal oxide based on SEM observation is 1 μm or less, and the thickness of the shell part based on SEM observation is 2 μm or less. In addition, the negative electrode contains negative active material particles composed of a carbon material. The negative active material particles contain graphite coated with amorphous carbon, and the krypton adsorption of the negative active material particles is 3.5 cm$^2$/g or more and 4 cm$^2$/g or less. In the battery described in Patent Document 1, a decrease in capacity retention over time is suppressed. That is, the battery described in Patent Document 1 has durability performance.

However, the high-rate input/output performance of the battery described in Patent Document 1 may not be necessarily sufficient.

PRIOR ART DOCUMENTS

Patent Documents

Patent Document 1: Japanese Patent No. 5630669

SUMMARY OF THE INVENTION

Problems to be Solved by the Invention

An object of the present embodiment is to provide an energy storage device sufficiently having both durability performance and high-rate input/output performance.

Means for Solving the Problems

The energy storage device of the present embodiment includes a positive electrode having a positive active material layer containing an active material in a form of particles. The positive active material layer contains primary particles of the active material and secondary particles formed by aggregation of a plurality of primary particles. A volume-based particle size frequency distribution of the active material of the positive active material layer has a first peak and a second peak that appears on a particle size larger than a particle size at the first peak. In the particle size frequency distribution, when a particle size having a minimum frequency between the first peak and the second peak is expressed as Dx, a proportion of particles having the particle size Dx or less relative to all particles of the active material is 5% or more and 40% or less. An energy storage device of this configuration can be sufficiently provided with both durability performance and high-rate input/output performance.

In the above energy storage device, the volume-based particle size frequency distribution of the active material of the positive active material layer may have a first peak and a second peak that appears on a particle size larger than a particle size at the first peak, and an average size Dp of the primary particles and a particle size D1 at the first peak may satisfy a relational expression $0.5 \leq D1/Dp \leq 2$. According to this configuration, the above energy storage device can be more sufficiently provided with both durability performance and high-rate input/output performance.

In the above energy storage device, a particle size D2 at the second peak may be 2 μm or more and 5 μm or less. According to this configuration, the above energy storage device can be more sufficiently provided with both durability performance and high-rate input/output performance.

The method for producing an energy storage device of the present embodiment includes preparing a positive electrode having the positive active material layer by forming the positive active material layer from a composite containing at least secondary particles of an active material, and assembling an energy storage device using the prepared positive electrode. In the preparation of the positive electrode, the positive active material layer is pressed to deagglomerate some of the secondary particles into primary particles, and a proportion of primary particles relative to all particles of the active material in the positive active material layer is adjusted to 5% or more and 40% or less.

Advantages of the Invention

According to the present embodiment, an energy storage device sufficiently having both durability performance and high-rate input/output performance can be provided.

MODE FOR CARRYING OUT THE INVENTION

Figure 1:
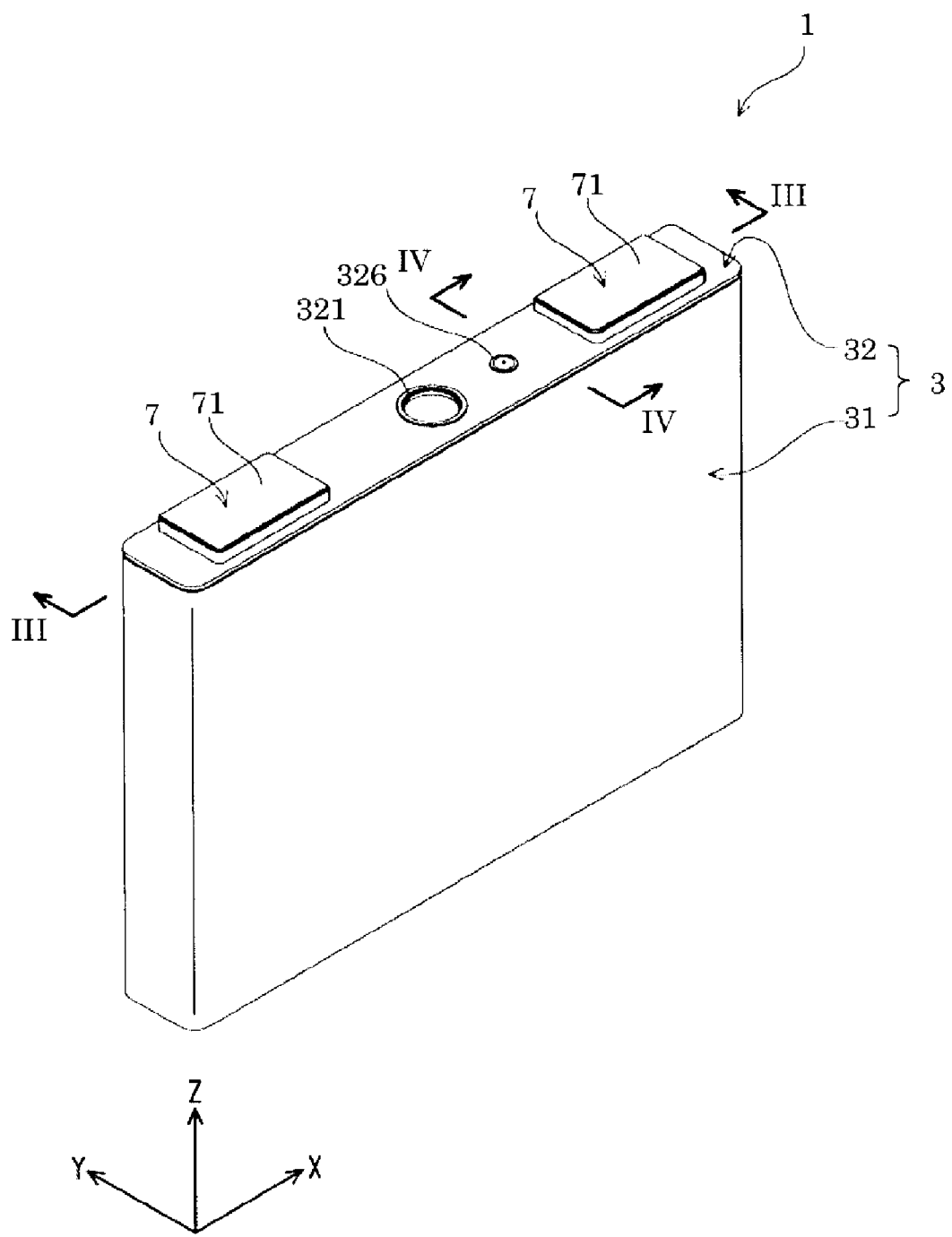
FIG. 1 is a perspective view of the energy storage device according to an embodiment.
Figure 2:
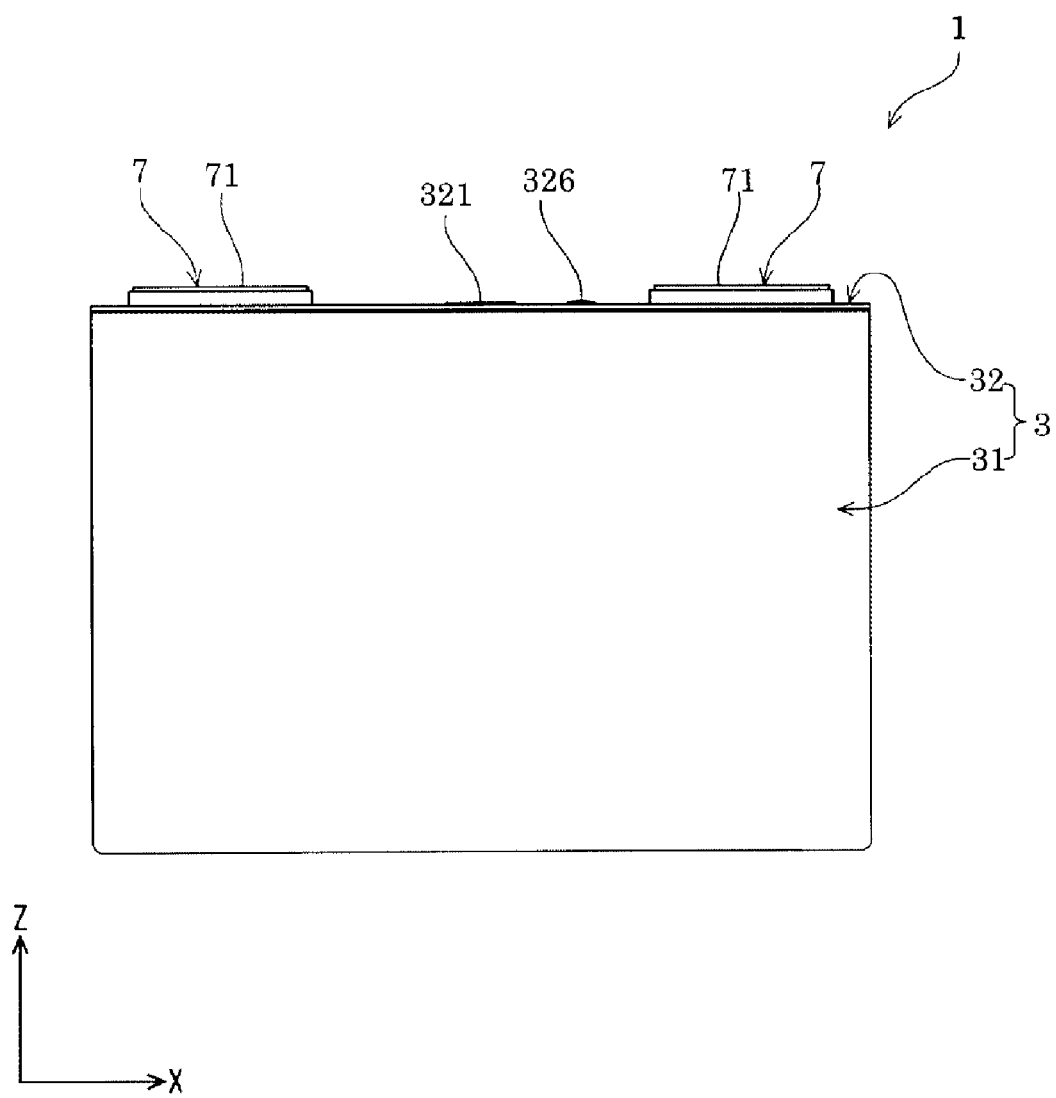
FIG. 2 is a front view of the energy storage device according to the embodiment.

Hereinafter, an embodiment of an energy storage device according to the present invention will be described with reference to FIG. 1 to FIG. 7. The energy storage device includes secondary batteries, capacitors, and the like. In the present embodiment, as an example of the energy storage device, a chargeable and dischargeable secondary battery will be described. Incidentally, the appellation of each constituent member (each constituent element) of the present embodiment is the appellation in the present embodiment, and may be different from the appellation of each constituent member (each constituent element) in the background art.

The energy storage device 1 of the present embodiment is a nonaqueous electrolyte secondary battery. More specifically, the energy storage device 1 is a lithium ion secondary battery utilizing the electron transfer that occurs following the migration of lithium ions. The energy storage device 1 of this type supplies electrical energy. The energy storage device 1 is used alone, or a plurality of them are used. Specifically, when the required output and the required voltage are low, the energy storage device 1 is used alone. Meanwhile, when at least one of the required output and the required voltage is high, the energy storage device 1 is used in combination with another energy storage device 1 in an energy storage apparatus 100. In the energy storage apparatus 100, the energy storage device 1 used in the energy storage apparatus 100 supplies electrical energy.

As shown in FIG. 1 to FIG. 7, the energy storage device 1 includes an electrode assembly 2 including a positive electrode 11 and a negative electrode 12, a case 3 housing the electrode assembly 2, and an external terminal 7 disposed outside the case 3 and conductively connected to the electrode assembly 2. In addition to the electrode assembly 2, the case 3, and the external terminal 7, the energy storage device 1 also has a current collector 5 that conductively connects the electrode assembly 2 and the external terminal 7, for example.

The electrode assembly 2 is formed by winding a layered body 22, which is obtained by layering the positive electrode 11 and the negative electrode 12 insulated from each other by a separator 4.

The positive electrode 11 has a metal foil 111 (positive electrode substrate), an active material layer 112 disposed along the surface of the metal foil 111 and containing an active material, and an electrically conductive layer 113 disposed between the metal foil 111 (positive electrode substrate) and the active material layer 112 and containing an electrically conductive auxiliary. In the present embodiment, the electrically conductive layer 113 overlaps each side of the metal foil 111. The active material layer 112 overlaps one side of each electrically conductive layer 113. The active material layer 112 is disposed on each thickness-direction side of the metal foil 111, and, similarly, the electrically conductive layer 113 is disposed on each thickness-direction side of the metal foil 111. Incidentally, the thickness of the positive electrode 11 is usually 40 μm or more and 150 μm or less.

The metal foil 111 is strip-shaped. The metal foil 111 of the positive electrode 11 of the present embodiment is an aluminum foil, for example. The positive electrode 11 has, at one edge in the width direction, which is the transverse direction of the strip shape, a non-covered part (portion where the positive active material layer is not formed) 115 of the positive active material layer 112.

The positive active material layer 112 contains an active material in the form of particles, an electrically conductive auxiliary in the form of particles, and a binder. The active material of the positive electrode 11 is a compound capable of occluding and releasing lithium ions. The thickness of the positive active material layer 112 (one layer) is usually 20 μm or more and 90 μm or less. The areal weight of the positive active material layer 112 (one layer) is 6.0 mg/cm$^2$ or more and 16.5 mg/cm$^2$ or less. The density of the positive active material layer 112 is 1.7 g/cm$^3$ or more and 2.6 g/cm$^3$ or less. The density is the density of one layer disposed to cover one side of the metal foil 111.

Figure 10:
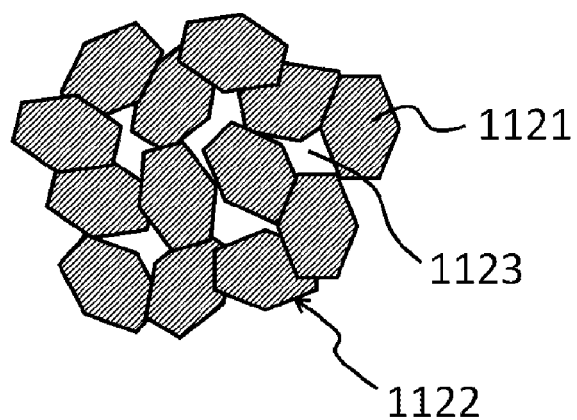
FIG. 10 is a schematic diagram of positive active material particles in the embodiment.
Figure 11:
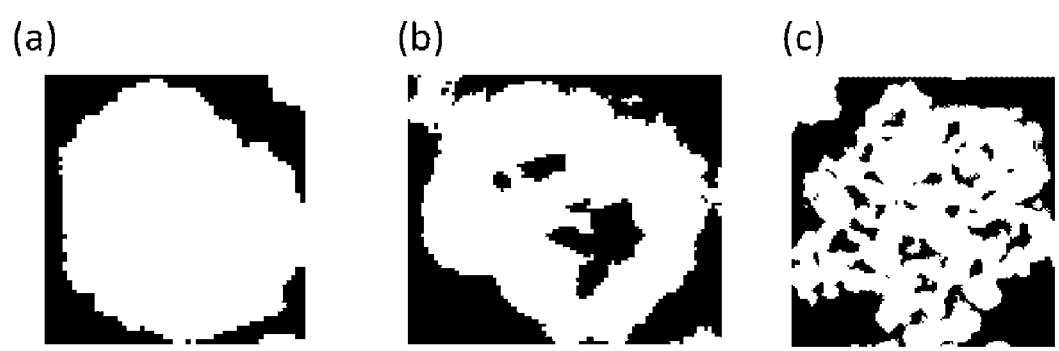
FIGS. 11(*a*), (*b*) and (*c*) are image processing diagrams, each showing a binarized image of a cross-section of a positive active material particle in the embodiment.

As shown in FIG. 10, the positive active material layer 112 contains primary particles 1121 of the active material and secondary particles 1122 formed by the aggregation of a plurality of primary particles 1121. Specifically, the positive active material layer 112 contains primary particles 1121, which are independently present, and secondary particles 1122, which are formed by the coagulation of primary particles with each other. In each secondary particle 1122, primary particles adhere to each other. At least some of the secondary particles 1122 have formed therein a hollow portion 1123. Incidentally, the hollow portion 1123 can be identified by binarizing an SEM image obtained by the SEM observation of a cross-section of the positive active material layer cut in the thickness direction using an ion beam. FIG. 11 shows binarized images of SEM images of three kinds of positive active materials having different hollow percentages. Here, the region surrounded by the outer periphery of the white region is defined as a secondary particle, and the black region present inside the secondary particle is defined as a hollow portion. In addition, the percentage of the value obtained by dividing the area of the hollow portion by the area of the secondary particle (including the area of the hollow portion) is defined as a hollow percentage. The hollow percentage of each particle shown in FIG. 11 is calculated as follows: (a) 0%, (b) 9.9%, and (c) 11.4%. Incidentally, the hollow percentage of the positive active material is preferably 5% or more, and more preferably 10% or more.

In the positive active material layer 112, the proportion of primary particles relative to all particles of the active material is 5% or more and 40% or less. This proportion may be 10% or more and 35% or less. This proportion is the proportion of primary particles independently present in the positive active material layer 112. This proportion is determined by laser-diffraction particle size distribution measurement. The proportion of primary particles can be increased by increasing the pressing pressure in the preparation of the positive electrode 11. That is, by increasing the pressing pressure, a larger number of secondary particles described above can be deagglomerated, whereby the proportion of primary particles in the positive active material layer 112 can be increased.

The volume-based particle size frequency distribution of the active material of the positive active material layer 112 has a first peak and a second peak that appears on a particle size larger than a particle size at the first peak. The average size Dp of the primary particles and the particle size D1 at the first peak satisfy the relational expression $0.5 \leq D1/Dp \leq 2$. The value of D1/Dp can be adjusted by changing the kind of active material in the form of particles in the preparation of the positive active material layer 112. For example, with respect to the particle size of primary particles constituting secondary particles of the active material, when secondary particles whose particle size relative to the particle size of the primary particles is larger is employed, and a positive active material layer 112 is prepared from a composite (described below) having incorporated therein such secondary particles, the value of D1/Dp can be increased.

In the particle size frequency distribution of the active material of the positive electrode 11, the frequency versus particle size of primary particles of the active material and that of the above secondary particles are expressed. The particle size frequency distribution is determined by measurement using a laser diffraction/scattering particle size distribution analyzer. The particle size frequency distribution is determined based on the volume of particles. The measurement conditions will be described in detail in the Examples. Incidentally, in the case where the particle size frequency distribution of the active material of a produced battery is measured, for example, the battery is charged at 1.0 C rate to 4.2 V, and then the battery is further discharged at a constant voltage of 4.2 V for 3 hours, followed by constant current discharge at 1.0 C rate to 2.0 V. Then, constant voltage discharge is performed at 2.0 V for 5 hours. Subsequently, the battery is disassembled in a dry atmosphere. The active material layer is removed, washed with dimethyl carbonate, ground, and then vacuum-dried for 2 hours or more. Then, the particle size frequency distribution can be measured using a particle size distribution analyzer.

The average size Dp of the primary particles of the positive active material layer 112 is usually 0.1 μm or more and 2.0 μm or less. The average size Dp of the primary particles is the average size of the primary particles independently present in the positive active material layer 112. The average size Dp of the primary particles is determined by measuring the diameters of at least a hundred primary particles in a scanning electron microscopic image of a thickness-direction cross section of the positive active material layer 112, and then averaging the measured values. When the primary particles are not perfectly spherical, the longest diameters are measured as their diameters.

In the particle size frequency distribution described above, the particle size D1 at the first peak is usually 0.1 μm or more and 1.0 μm or less. The particle size D2 at the second peak is usually 2 μm or more and 5 μm or less.

In the particle size frequency distribution described above, when the particle size having the minimum frequency between the first peak and the second peak is expressed as Dx, the proportion of particles having the particle size Dx or less is 5% or more and 40% or less relative to all particles of the active material. The proportion of particles having the particle size Dx or less is determined from the proportion of the area of the part where the particle size is Dx or less in the particle size frequency distribution relative to the entire area. The proportion of particles having the particle size Dx or less is usually determined using a software attached to the particle size distribution analyzer described above.

The porosity of the positive active material layer 112 is usually 25% or more and 50% or less.

The active material of the positive electrode 11 is a lithium metal oxide, for example. Specifically, for example, the active material of the positive electrode is a composite oxide represented by $Li_xMeO_e$ (Me represents at least one transition metal) ($Li_xNi_aO_2$, $Li_xCo_bO_2$, $Li_xMn_cO_4$, $Li_xNi_a$-$Co_bMn_cO_2$, etc.) or a polyanion compound represented by $Li_tMe_u(XO_v)_w$ (Me represents at least one transition metal, and X represents P, Si, B, or V, for example) ($Li_tFe_uPO_4$, $Li_tMn_uPO_4$, $Li_tMn_uSiO_4$, $Li_tCo_uPO_4F$, etc.).

In the present embodiment, the active material of the positive electrode 11 is a lithium metal composite oxide represented by the chemical composition $Li_xNi_aCo_bMn_cM_dO_e$ (wherein $0<x\leq 1.3$, $a+b+c+d=1$, $0\leq a\leq 1$, $0\leq b\leq 1$, $0\leq c\leq 1$, $0\leq d\leq 1$, and $1.7\leq e\leq 2.3$.). Incidentally, $0<a<1$, $0<b<1$, and $0<c<1$, and it is also possible that d=0.

Examples of lithium metal composite oxides represented by the above chemical composition $Li_xNi_aCo_bMn_cM_dO_e$ include $LiNi_{1/3}Co_{1/3}Mn_{1/3}O_2$, $LiNi_{1/6}Co_{1/6}Mn_{2/3}O_2$, and $LiCoO_2$.

Examples of binders used for the positive active material layer 112 include polyvinylidene fluoride (PVdF), a copolymer of ethylene and vinyl alcohol, polymethyl methacrylate, polyethylene oxide, polypropylene oxide, polyvinyl alcohol, polyacrylic acid, polymethacrylic acid, and styrene-butadiene rubber (SBR). The binder of the present embodiment is polyvinylidene fluoride.

The electrically conductive auxiliary of the positive active material layer 112 is a carbonaceous material including 98 mass % or more carbon. Examples of carbonaceous materials include ketjen black (registered trademark), acetylene black, and graphite. The positive active material layer 112 of the present embodiment has acetylene black as an electrically conductive auxiliary.

The electrically conductive layer 113 contains an electrically conductive auxiliary in the form of particles and a binder (binding agent). Incidentally, the electrically conductive layer 113 does not contain a positive active material. The electrically conductive layer 113 is formed porous due to voids in the electrically conductive auxiliary. The electrically conductive layer 113 contains an electrically conductive auxiliary and thus has electrical conductivity. The electrically conductive layer 113 serves as a path for electrons between the metal foil 111 and the positive active material layer 112 and maintains the electrical conductivity between them. The electrical conductivity of the electrically conductive layer 113 is usually higher than the electrically conductivity of the active material layer 112.

The electrically conductive layer 113 is disposed between the metal foil 111 and the positive active material layer 112. The electrically conductive layer 113 containing a binder (binding agent) has sufficient adhesiveness to the metal foil 111. The electrically conductive layer 113 has sufficient adhesiveness also to the positive active material layer 112.

The thickness of the electrically conductive layer 113 is usually 0.1 μm or more and 2.0 μm or less. The areal weight of the electrically conductive layer 113 is usually 0.25 g/m² or more and 0.65 g/m² or less.

The electrically conductive auxiliary of the electrically conductive layer 113 is carbonaceous material including 98 mass % or more carbon. The electrical conductivity of a carbonaceous material is usually $10^{-6}$ S/m or more. Examples of carbonaceous materials include ketjen black (registered trademark), acetylene black, and graphite. The electrically conductive layer 113 of the present embodiment has acetylene black as an electrically conductive auxiliary. The particle size of the electrically conductive auxiliary is usually 20 nm or more and 150 nm or less.

Examples of binders for the electrically conductive layer 113 include synthetic polymer compounds such as polyvinylidene fluoride (PVdF), a copolymer of vinylidene fluoride and hexafluoropropylene, a copolymer of ethylene and vinyl alcohol, polyacrylonitrile, polyphosphazene, polysiloxane, polyvinyl acetate, polymethyl methacrylate, polystyrene, polycarbonate, polyamide, polyimide, polyamide-imide, polyethylene oxide (polyethylene glycol), polypropylene oxide (polypropylene glycol), polyvinyl alcohol, polyacrylic acid, polymethacrylic acid, polytetrafluoroethylene (PTFE), styrene-butadiene rubber (SBR), polyolefin, and nitrile-butadiene rubber. In addition, examples of binders for the electrically conductive layer 113 also include natural polymer compounds such as chitosan, chitosan derivatives, cellulose, and cellulose derivatives.

The electrically conductive layer 113 usually contains 20 mass % or more and 50 mass % or less of a carbonaceous material as an electrically conductive auxiliary and 50 mass % or more and 80 mass % or less of a binder.

The negative electrode 12 has a metal foil 121 (negative electrode substrate) and a negative active material layer 122 formed on the metal foil 121. In the present embodiment, the negative active material layer 122 is placed to overlap each side of the metal foil 121. The metal foil 121 is strip-shaped. The metal foil 121 of the negative electrode of the present embodiment is a copper foil, for example. The negative electrode 12 has, at one edge in the width direction, which is the transverse direction of the strip shape, a non-covered part (portion where the negative active material layer is not formed) 125 of the negative active material layer 122. The thickness of the negative electrode 12 (one layer) is usually 40 μm or more and 150 μm or less.

The negative active material layer 122 contains an active material in the form of particles and a binder. The negative active material layer 122 is disposed to face the positive electrode 11 through the separator 4. The width of the negative active material layer 122 is larger than the width of the positive active material layer 112.

The proportion of the binder in the negative active material layer 122 may be 5 mass % or more and 10 mass % or less relative to the total mass of the active material and the binder of the negative electrode.

The active material of the negative electrode 12 is a material capable of contributing to the electrode reactions in the negative electrode 12, such as charge reactions and discharge reactions. For example, the active material of the negative electrode 12 is a carbon material, such as graphite or amorphous carbon (non-graphitizable carbon, graphitizable carbon), or a material that causes an alloying reaction with lithium ions, such as silicon (Si) or tin (Sn). Here, graphite refers to a carbon material where the average lattice plane spacing (d002) of the (002) plane determined by a wide-angle X-ray diffraction method is less than 0.340 nm. In addition, in amorphous carbon, the (002) plane spacing measured by a wide-angle X-ray diffraction in a discharged state is 0.340 nm or more. The active material of the negative electrode of the present embodiment is amorphous carbon. More specifically, the active material of the negative electrode is non-graphitizable carbon.

The thickness of the negative active material layer 122 (one layer) is usually 10 μm or more and 50 μm or less. The areal weight of the negative active material layer (one layer) 122 is usually 2.5 mg/cm$^2$ or more and 5.0 mg/cm$^2$ or less. The density of the negative active material layer 122 (one layer) is usually 0.8 g/cm$^3$ or more and 1.6 g/cm$^3$ or less.

Binders used for the negative active material layer 122 are the same as the binders used for the positive active material layer 112. The binder of the present embodiment is polyvinylidene fluoride.

The negative active material layer 122 may further have an electrically conductive auxiliary such as ketjen black (registered trademark), acetylene black, or graphite.

In the electrode assembly 2 of the present embodiment, the positive electrode 11 and the negative electrode 12 configured as above are insulated from each other by the separator 4 and wound in this state. That is, in the electrode assembly 2 of the present embodiment, the layered body 22 of the positive electrode 11, the negative electrode 12, and the separator 4 is wound. The separator 4 is a member having insulating properties. The separator 4 is disposed between the positive electrode 11 and the negative electrode 12. As a result, in the electrode assembly 2 (specifically, the layered body 22), the positive electrode 11 and the negative electrode 12 are insulated from each other. In addition, the separator 4 holds an electrolyte solution in the case 3. As a result, at the time of charging and discharging the energy storage device 1, lithium ions move between the positive and negative electrodes 11 and 12 alternately layered with the separator 4 therebetween.

The separator 4 is strip-shaped. The separator 4 has a porous separator substrate. The separator 4 of the present embodiment is composed only of a separator substrate. The separator 4 is disposed between the positive electrode 11 and the negative electrode 12 in order to prevent a short circuit between the positive electrode 11 and the negative electrode 12.

The separator substrate is porous formed of a woven fabric, a nonwoven fabric, or a porous membrane, for example. Examples of materials for the separator substrate include polymer compounds, glass, and ceramic. Examples of polymer compounds include polyesters such as polyacrylonitrile (PAN), polyamide (PA), and polyethylene terephthalate (PET), polyolefins (PO) such as polypropylene (PP) and polyethylene (PE), and cellulose.

Figure 6:
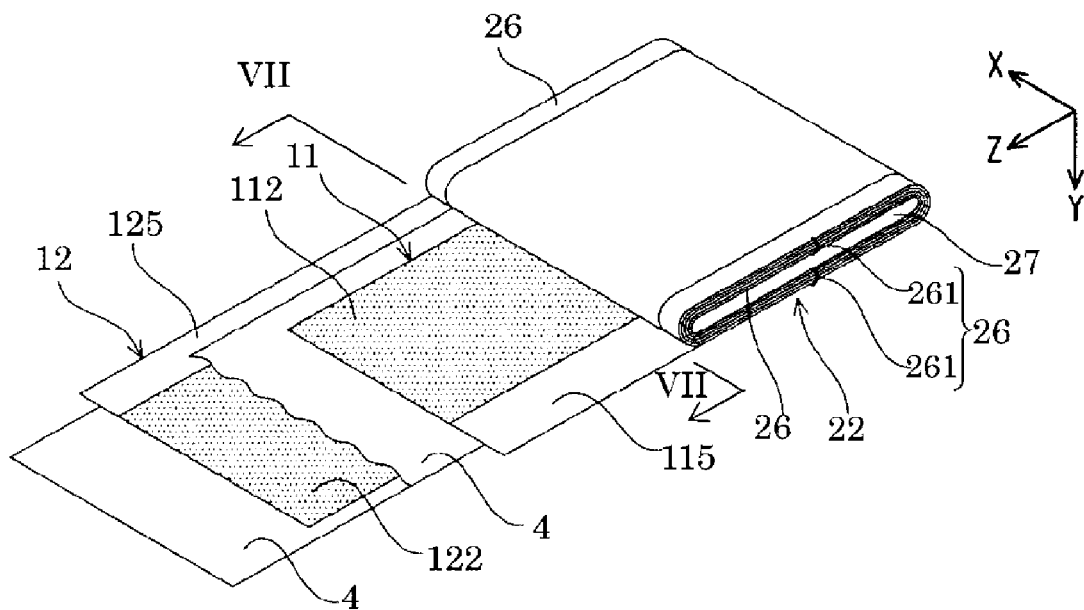
FIG. 6 is a diagram for describing the configuration of the electrode assembly of the energy storage device according to the embodiment.
Figure 7:
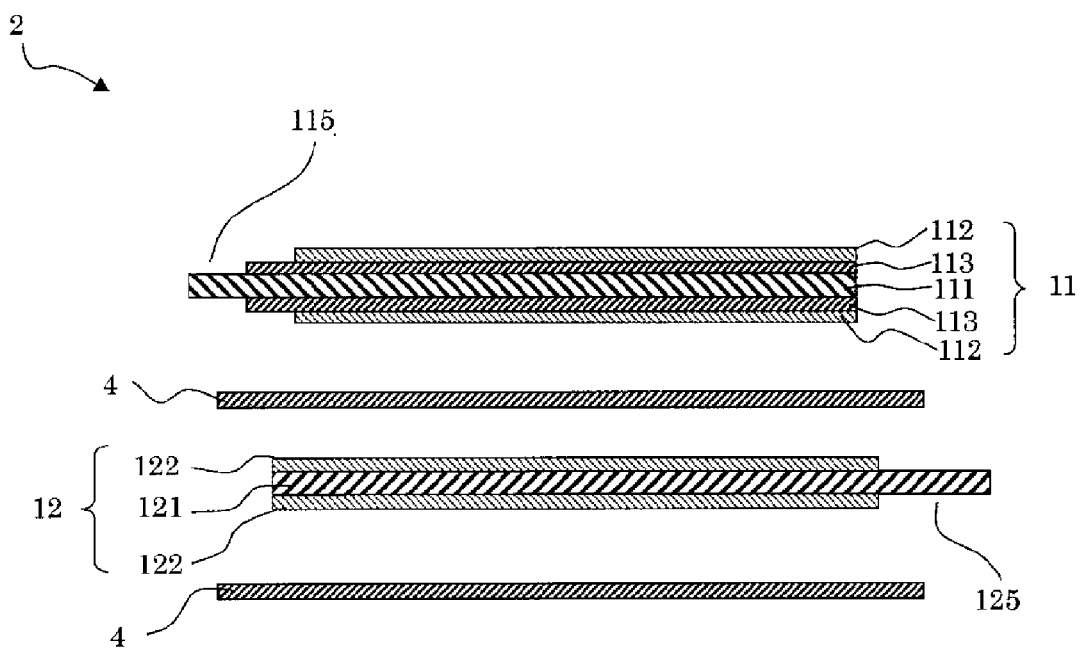
FIG. 7 is a cross-sectional view of a stack of the positive electrode, the negative electrode, and a separator (VII-VII cross-section of FIG. 6).

The width of the separator 4 (the dimension in the transverse direction of the strip shape) is slightly larger than the width of the negative active material layer 122. The separator 4 is disposed between the positive electrode 11 and the negative electrode 12, which are stacked and staggered in the width direction in such a manner that the positive active material layer 112 and the negative active material layer 122 overlap each other. At this time, as shown in FIG. 6, the non-covered part 115 of the positive electrode 11 and the non-covered part 125 of the negative electrode 12 do not overlap. That is, the non-covered part 115 of the positive electrode 11 projects in the width direction from the region where the positive electrode 11 and the negative electrode 12 overlap, and the non-covered part 125 of the negative electrode 12 projects in the width direction from the region where the positive electrode 11 and the negative electrode 12 overlap (in the direction opposite from the projecting direction of the non-covered part 115 of the positive electrode 11). The positive electrode 11, the negative electrode 12, and the separator 4 in a layered state, that is, the layered body 22, is wound to form the electrode assembly 2. The portion where only the non-covered part 115 of the positive electrode 11 or the non-covered part 125 of the negative electrode 12 is layered forms a non-covered layered part 26 in the electrode assembly 2.

The non-covered layered part 26 is a portion conductively connected to the current collector 5 in the electrode assembly 2. The non-covered layered part 26 is divided into two portions (non-covered layered part divided in two) 261 across a space part 27 as viewed from the winding center direction of the wound positive electrode 11, negative electrode 12, and separator 4 (see FIG. 6).

The non-covered layered part 26 configured as above is provided in each electrode of the electrode assembly 2. That is, the non-covered layered part 26 where only the non-covered part 115 of the positive electrode 11 is layered forms the non-covered layered part of the positive electrode 11 in the electrode assembly 2, while the non-covered layered part 26 where only the non-covered part 125 of the negative electrode 12 is layered forms the non-covered layered part of the negative electrode 12 in the electrode assembly 2.

The case 3 has a case body 31 having an opening and a lid plate 32 that seals (closes) the opening of the case body 31. The case 3 houses an electrolyte solution in the internal space together with the electrode assembly 2, the current collector 5, and the like. The case 3 is made of a metal having resistance to the electrolyte solution. The case 3 is made of an aluminum-based metal material, such as aluminum or an aluminum alloy, for example. The case 3 may also be made of a metal material, such as stainless steel or nickel, or a composite material obtained by bonding a resin such as nylon to aluminum.

The electrolyte solution is a nonaqueous electrolyte solution. The electrolyte solution is obtained by dissolving an electrolyte salt in an organic solvent. Examples of organic solvents include cyclic carbonates, such as propylene carbonate and ethylene carbonate, and linear carbonates, such as dimethyl carbonate, diethyl carbonate, and ethyl methyl carbonate. Examples of electrolyte salts include $LiClO_4$, $LiBF_4$, and $LiPF_6$. The electrolyte solution of the present embodiment is obtained by dissolving 0.5 to 1.5 mol/L of $LiPF_6$ in a mixed solvent of propylene carbonate, dimethyl carbonate, and ethyl methyl carbonate mixed in a predetermined ratio.

The case 3 is formed by joining the peripheral edge portion of the opening of the case body 31 and the peripheral edge portion of the rectangular-shaped lid plate 32 in a superposed state. In addition, the case 3 has an internal space defined by the case body 31 and the lid plate 32. In the present embodiment, the peripheral edge portion of the opening of the case body 31 and the peripheral edge portion of the lid plate 32 are joined by welding. Hereinafter, as shown in FIG. 1, the long-side direction of the lid plate 32 is referred to as X-axis direction, the short-side direction of the lid plate 32 is referred to as Y-axis direction, and the normal direction of the lid plate 32 is referred to as Z-axis direction.

The case body 31 is in the shape of a polygonal cylinder with one end in the opening direction (Z-axis direction) sealed (i.e., the shape of a bottomed polygonal cylinder). The lid plate 32 is a plate-shaped member that seals the opening of the case body 31.

The lid plate 32 has a gas release valve 321 capable of releasing a gas in the case 3 to the outside. The gas release valve 321 releases a gas from the case 3 to the outside when the internal pressure of the case 3 increases to a predetermined pressure. The gas release valve 321 is provided in the central portion of the lid plate 32 in the X-axis direction.

The case 3 includes an electrolyte solution filling hole for injecting an electrolyte solution. The electrolyte solution filling hole communicates between the interior and exterior of the case 3. The electrolyte solution filling hole is provided in the lid plate 32. The electrolyte solution filling hole is hermetically closed by an electrolyte solution filling plug 326 (sealed). The electrolyte solution filling plug 326 is fixed to the case 3 by welding (to the lid plate 32 in the example of the present embodiment).

The external terminal 7 is a portion that is electrically connected to the external terminal 7 of another energy storage device 1, an external device, or the like. The external terminal 7 is made of a member having electrical conductivity. For example, the external terminal 7 is made of a metal material having high weldability such as an aluminum-based metal material (e.g., aluminum or an aluminum alloy) or a copper-based metal material (e.g., copper or a copper alloy).

The external terminal 7 has a surface 71 to which a bus bar or the like can be welded. The surface 71 is a flat surface. The external terminal 7 is in the shape of a plate extending along the lid plate 32. Specifically, the external terminal 7 is in the shape of a rectangular plate as viewed from the Z-axis directional.

The current collector 5 is disposed in the case 3 and directly or indirectly connected to the electrode assembly 2 to allow for the passage of current. The current collector 5 of the present embodiment is connected to the electrode assembly 2 to allow for the passage of current through a clip member 50. That is, the energy storage device 1 includes a clip member 50 which connects the electrode assembly 2 and the current collector 5 to allow for the passage of current.

Figure 3:
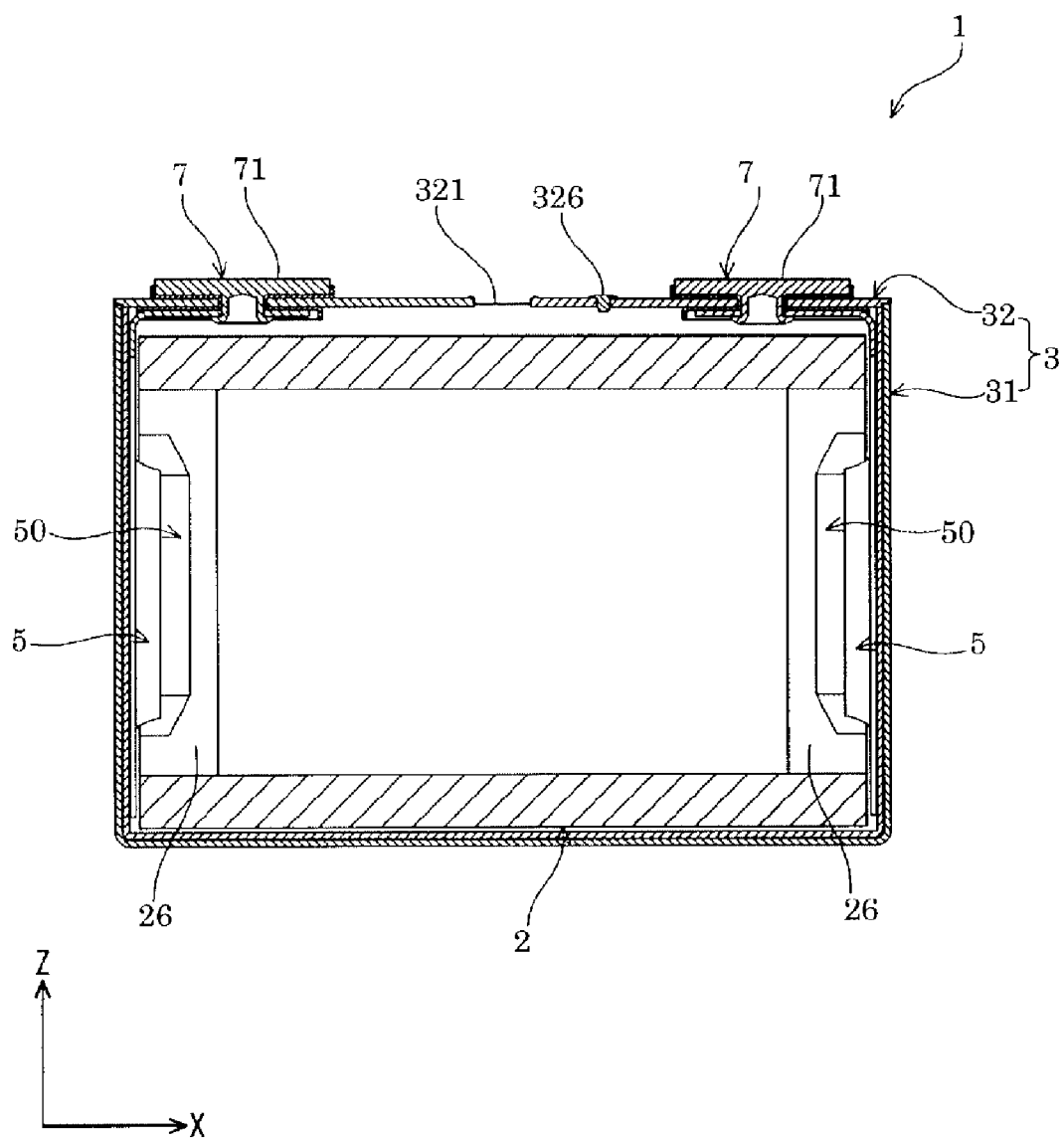
FIG. 3 is a cross-sectional view along the line III-III of FIG. 1.
Figure 4:
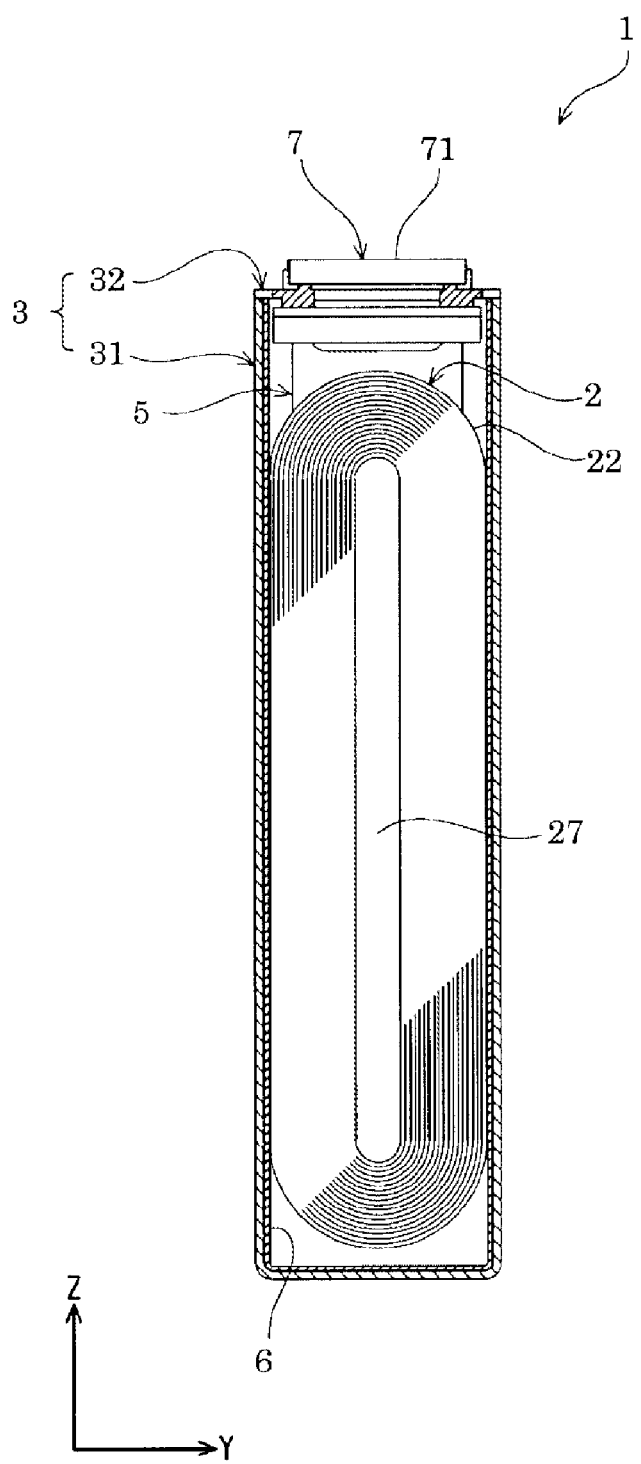
FIG. 4 is a cross-sectional view along the line IV-IV of FIG. 1.
Figure 5:
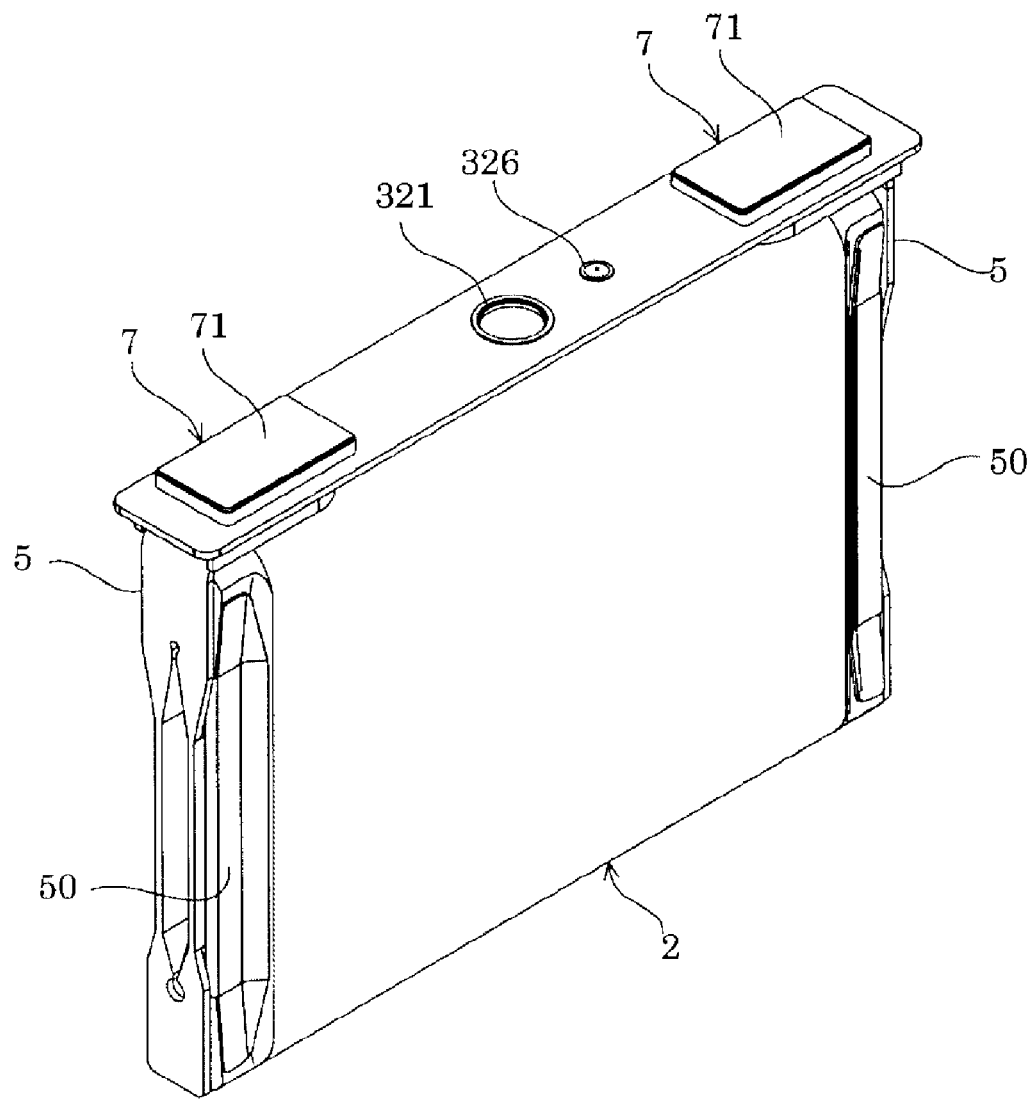
FIG. 5 is a perspective view of the partially assembled energy storage device according to the embodiment, showing an electrolyte solution filling plug, an electrode assembly, a current collector, and an external terminal attached to a lid plate.
Figure 5:
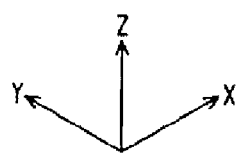

The current collector 5 is made of a member having electrical conductivity. As shown in FIG. 3, the current collector 5 is disposed along the inner surface of the case 3. The current collector 5 is provided to each of the positive electrode 11 and the negative electrode 12 of the energy storage device 1. In the energy storage device 1 of the present embodiment, in the case 3, the current collector 5 is provided to each of the non-covered layered part 26 of the positive electrode 11 and the non-covered layered part 26 of the negative electrode 12 of the electrode assembly 2.

The current collector 5 of the positive electrode 11 and the current collector 5 of the negative electrode 12 are made of different materials. Specifically, the current collector 5 of the positive electrode 11 is made of aluminum or an aluminum alloy, for example, and the current collector 5 of the negative electrode 12 is made of copper or a copper alloy, for example.

In the energy storage device 1 of the present embodiment, the electrode assembly 2 in the state of being housed in a bag-shaped insulating cover 6 that insulates the electrode assembly 2 and the case 3 (specifically, the electrode assembly 2 and the current collector 5) is housed in the case 3.

Next, the method for producing an energy storage device of the present embodiment will be described.

Figure 8:
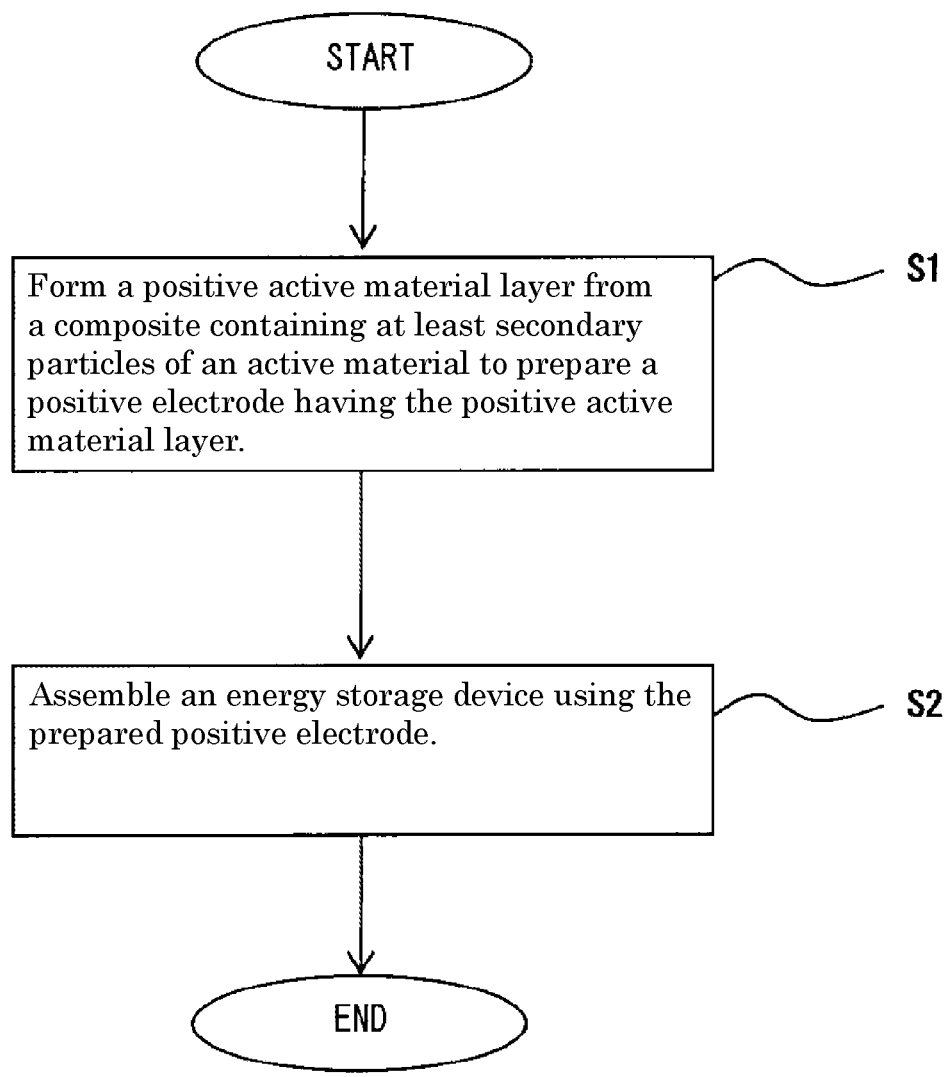
FIG. 8 is a flow chart showing the steps of a method for producing an energy storage device.

The method for producing an energy storage device of the present embodiment includes, as shown in FIG. 8, forming a positive active material layer from a composite containing at least secondary particles of an active material to prepare a positive electrode having the positive active material layer (step 1) and assembling an energy storage device using the prepared positive electrode (step 2). In the preparation of the positive electrode, the positive active material layer is pressed to deagglomerate some of the secondary particles into primary particles, and the proportion of primary particles relative to all particles of the active material in the positive active material layer is adjusted to 5% or more and 40% or less.

Specifically, the method for producing an energy storage device of the present embodiment includes preparing electrodes including the preparation of a positive electrode described above (step 1) and the preparation of a negative electrode; forming an electrode assembly having the positive electrode and the negative electrode; and placing the electrode assembly in a case to assemble an energy storage device.

Specifically, in the method for producing an energy storage device 1, first, a composite containing an active material is applied to a metal foil (electrode substrate) to form an active material layer, thereby preparing an electrode (the positive electrode 11 and the negative electrode 12). Incidentally, in the preparation of the positive electrode 11, an electrically conductive layer 113 containing an electrically conductive auxiliary is formed on a metal foil 111, and then an active material layer 112 is formed. Next, the positive electrode 11, a separator 4, and the negative electrode 12 are stacked to form an electrode assembly 2. Subsequently, the electrode assembly 2 is placed in a case 3, and an electrolyte solution is placed in the case 3, whereby the energy storage device 1 is assembled.

In Step 1 (preparation of the positive electrode 11), a composition for an electrically conductive layer containing an electrically conductive auxiliary, a binder, and a solvent is applied to both sides of a metal foil and then dried at 100 to 160° C., for example, thereby forming an electrically conductive layer 113. Further, a composite containing an active material, a binder, and a solvent is applied to each conductive layer, thereby forming a positive active material layer 112. As an application method for forming the electrically conductive layer 113 or the positive active material layer 112, an ordinary method is employed. The applied electrically conductive layer 113 and positive active material layer 112 are roll-pressed at a predetermined temperature (e.g., 80 to 150° C.) and a predetermined pressure (e.g., a linear load of 5 to 100 kg/cm). By adjusting the pressing pressure, the density of the electrically conductive layer 113 or the positive active material layer 112 can be adjusted. After pressing, vacuum drying is performed at 80 to 140° C. for 12 to 24 hours. Incidentally, a negative electrode is similarly prepared without forming an electrically conductive layer.

In Step 1 (preparation of the positive electrode 11), the positive active material layer 112 is formed in such a manner that the proportion of primary particles relative to all particles of the active material in the positive active material layer 112 is 5% or more and 40% or less. In addition, the positive active material layer 112 can be formed in such a manner that the average size Dp of the primary particles described above and the particle size D1 at the first peak satisfy the relational expression $0.5 \leq D1/Dp \leq 2$. In addition, the positive active material layer 112 can be formed in such a manner that the proportion of particles having the particle size Dx or less is 5% or more and 40% or less relative to all particles of the active material. In addition, the positive active material layer 112 can be formed in such a manner that the particle size D2 at the second peak described above is 2 µm or more and 5 µm or less.

In the formation of the positive active material layer 112, a composite is prepared using secondary particles formed by the coagulation of primary particles of the active material with each other. After the application of the composite, the pressing pressure in roll pressing described above can be adjusted to adjust the proportion of primary particles described above, the proportion of particles having the particle size Dx or less described above, and the like. Specifically, by increasing the pressing pressure, secondary particles can be further deagglomerated. Accordingly, the number of primary particles resulting from the deagglomeration of secondary particles can be increased. Accordingly, by increasing the pressing pressure, the proportion of primary particles described above can be increased, and the proportion of particles having the particle size Dx or less described above can be increased. Incidentally, in the formation of the positive active material layer 112, the proportion of primary particles described above, the proportion of particles having the particle size Dx or less described above, and the like can be adjusted also by the following method. For example, when a composite containing secondary particles (active material), a binder, and a solvent is mixed, by further increasing the shear force given to the composite, a larger number of secondary particles can be deagglomerated, and the number of primary particles in the positive active material layer 112 can be further increased. In addition, for example, primary particles formed by crushing secondary particles may be incorporated into a composite. By increasing the crushing force, the number of primary particles in the positive active material layer 112 can be increased.

In Step 2 (formation of the electrode assembly 2), a layered body 22 including the positive electrode 11, the negative electrode 12, and a separator 4 sandwiched therebetween is wound to form an electrode assembly 2. Specifically, the positive electrode 11, the separator 4, and the negative electrode 12 are stacked in such a manner that the positive active material layer 112 and the negative active material layer 122 face each other through the separator 4, thereby forming the layered body 22. Subsequently, the layered body 22 is wound to form an electrode assembly 2.

In the assembly of the energy storage device 1, the electrode assembly 2 is placed in a case body 31 of the case 3, the opening of the case body 31 is sealed with the lid plate 32, and an electrolyte solution is injected into the case 3. When sealing the opening of the case body 31 with the lid plate 32, the electrode assembly 2 is placed in the interior of the case body 31, and, in the state where the positive electrode 11 is conductively connected to one external terminal 7, and the negative electrode 12 is conductively connected to the other external terminal 7, the opening of the case body 31 is sealed with the lid plate 32. When injecting an electrolyte solution into the case 3, the electrolyte solution is injected into the case 3 from the injection hole in the lid plate 32 of the case 3.

In the energy storage device 1 of the present embodiment configured as above, the positive active material layer 112 contains primary particles of the active material and secondary particles formed by the aggregation of a plurality of primary particles. The proportion of primary particles relative to all particles of the active material in the positive active material layer 112 is 5% or more and 40% or less. When the proportion of primary particles described above is less than 5%, although the durability performance of the battery is sufficient, the input/output performance may be insufficient. Meanwhile, when the proportion of primary particles described above is more than 40%, the surface area of the active material may be too large, resulting in insufficient durability performance of the battery. Accordingly, the above energy storage device 1 can be sufficiently provided with both durability performance and high-rate input/output performance.

In the above energy storage device 1, the volume-based particle size frequency distribution of the active material of the positive active material layer 112 has a first peak and a second peak that appears on a particle size larger than the particle size at the first peak. The average size Dp of the primary particles and the particle size D1 at the first peak satisfy the relational expression $0.5 \leq D1/Dp \leq 2$. According to this configuration, the above energy storage device 1 can be more sufficiently provided with both durability performance and high-rate input/output performance.

In the above energy storage device 1, in the particle size frequency distribution, when the particle size having the minimum frequency between the first peak and the second peak is expressed as Dx, the proportion of particles having the particle size Dx or less relative to all particles of the active material is 5% or more and 40% or less. As a result, the above energy storage device 1 can be more sufficiently provided with both durability performance and high-rate input/output performance.

In the above energy storage device 1, the particle size D2 at the second peak is 2 µm or more and 5 µm or less. As a result, both durability performance and high-rate input/output performance are more sufficiently exerted.

In the above energy storage device 1, the active material of the positive electrode is a lithium metal composite oxide. A lithium metal composite oxide is represented by the chemical composition $Li_xNi_aMn_bCo_cM_dO_e$ (wherein $0<x\leq1.3$, $a+b+c+d=1$, $0\leq a\leq1$, $0\leq b\leq1$, $0\leq c\leq1$, $0\leq d\leq1$, and $1.7\leq e\leq2.3$). In addition, the active material of the negative electrode is non-graphitizable carbon. The above energy storage device 1 can be more reliably and more sufficiently provided with both durability performance and high-rate input/output performance.

The method for producing an energy storage device of the present embodiment implemented as described above includes forming a positive active material layer 112 from a composite containing at least secondary particles of an active material to prepare a positive electrode 11 having the positive active material layer 112 (step 1) and assembling an energy storage device 1 using the prepared positive electrode 11 (step 2). In Step 1, the positive active material layer 112 is pressed to deagglomerate some of the secondary particles into primary particles, and the proportion of primary particles relative to all particles of the active material in the positive active material layer 112 is adjusted to 5% or more and 40% or less. As a result, the energy storage device 1 configured as above can be produced.

Incidentally, the energy storage device of the present invention is not limited to the above embodiment, and, needless to say, various modifications can be made without deviating from the gist of the present invention. For example, the configuration of one embodiment can be added to the configuration of another embodiment. In addition, part of the configuration of one embodiment can be replaced with the configuration of another embodiment. Further, part of the configuration of one embodiment can be deleted.

In the above embodiment, a positive electrode having an electrically conductive layer disposed between a metal foil and an active material layer has been described in detail. However, in the present invention, it is also possible that the positive electrode does not have an electrically conductive layer, and the active material layer of the positive electrode directly contacts the metal foil.

In the above embodiment, electrodes configured such that an active material layer is disposed on each side of the metal foil of each electrode have been described. However, in the energy storage device of the present invention, it is also possible that the positive electrode 11 or the negative electrode 12 has the active material layer only on one side of the metal foil.

In the above embodiment, the energy storage device 1 including the electrode assembly 2 obtained by winding the layered body 22 has been described in detail. However, the energy storage device of the present invention may include a layered body 22 that is not wound. Specifically, the energy storage device may include an electrode assembly formed of a positive electrode, a separator, a negative electrode, and a separator each formed in a rectangular shape and stacked in this order a plurality of times.

In the above embodiment, the case where the energy storage device 1 is used as a chargeable and dischargeable nonaqueous electrolyte secondary battery (lithium ion secondary battery) has been described. However, the kind and size (capacity) of the energy storage device 1 are arbitrary. In addition, in the above embodiment, a lithium ion secondary battery has been described as an example of the energy storage device 1, but the invention is not limited thereto. For example, the present invention is applicable to various secondary batteries and also to energy storage devices of capacitors such as electric double layer capacitors.

Figure 9:
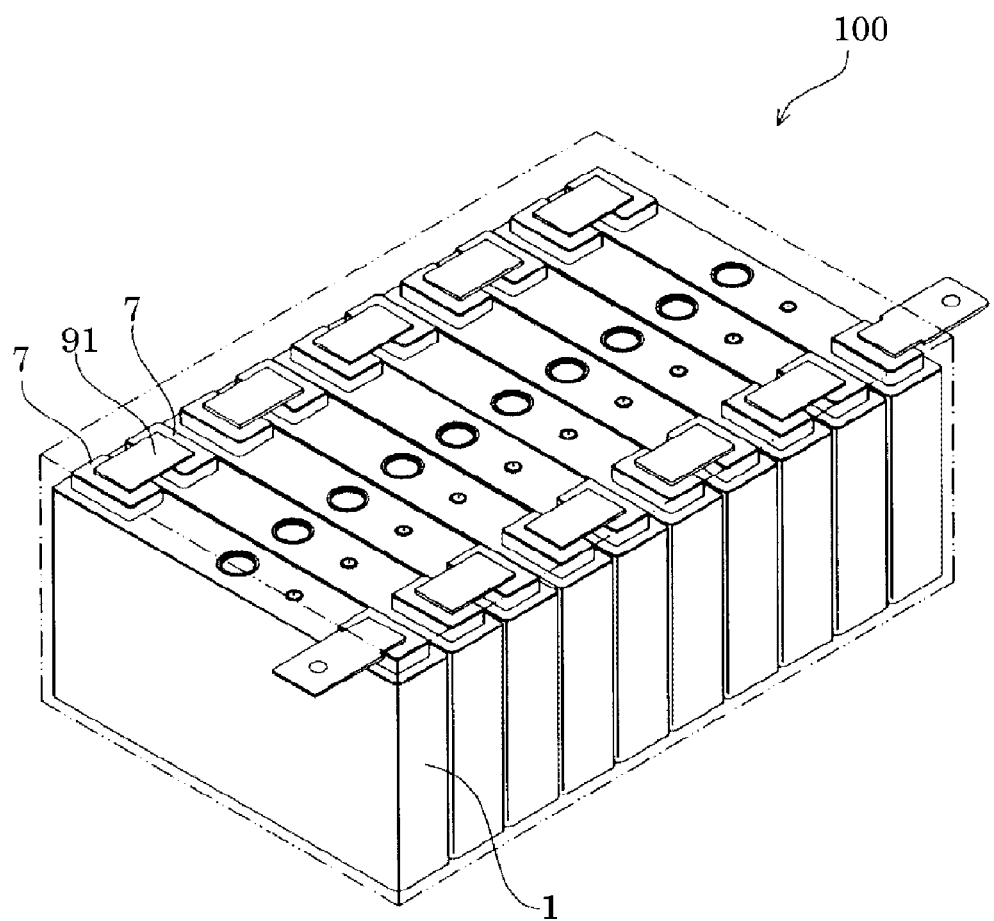
FIG. 9 is a perspective view of an energy storage apparatus including the energy storage device according to the embodiment.

The energy storage device 1 (for example, battery) may be used in an energy storage apparatus 100 as shown in FIG. 9 (a battery module in the case where the energy storage device is a battery). The energy storage apparatus 100 has at least two energy storage devices 1 and a bus bar member 91 that electrically connects the two (different) energy storage devices 1. In this case, it is necessary that the technology of the present invention is applied to at least one energy storage device.

EXAMPLES

Nonaqueous electrolyte secondary batteries (lithium ion secondary batteries) were produced as follows.

Test Example 1

(1) Preparation of Positive Electrode

N-methyl-2-pyrrolidone (NMP) as a solvent, an electrically conductive auxiliary (acetylene black), and a binder (PVdF) were mixed and kneaded to prepare a composition for an electrically conductive layer. The amounts of the electrically conductive auxiliary and the binder incorporated were 50 mass % and 50 mass %, respectively. The prepared composition for an electrically conductive layer was applied to both sides an aluminum foil (15 µm thickness) to a coating weight (areal weight) after drying of 0.1 mg/cm² each side, followed by drying.

Next, N-methyl-2-pyrrolidone (NMP) as a solvent, an electrically conductive auxiliary (acetylene black), a binder (PVdF), and particles of an active material ($LiNi_{1/3}Co_{1/3}Mn_{1/3}O_2$) having an average particle size D50 of 5 µm were mixed and kneaded to prepare a composite for a positive electrode. The amounts of the electrically conductive auxiliary, the binder, and the active material incorporated were 4.5 mass %, 4.5 mass %, and 91 mass %, respectively. The prepared composite for a positive electrode was applied to the electrically conductive layer to a coating weight (areal weight) after drying of 10 mg/cm² each side. After drying, roll pressing was performed. Then, vacuum drying was performed to remove moisture and the like. The thickness of the active material layer (one layer) after pressing was 30 µm. The density of the active material layer was 2.6 g/cm³. The porosity of the active material layer was 38. The thickness of the electrically conductive layer after pressing was 1 µm. The density of the electrically conductive layer was 1.0 g/cm³.

Active Material

As an active material incorporated into the composite, secondary particles formed by the coagulation of primary particles with each other (coagulated particles) were used. The average particle size of the primary particles forming the secondary particles was 0.8 µm. This average particle size is the average size Dp described above. This average particle size was determined by measuring the diameters of a hundred primary particles in a scanning electron microscopic image and averaging the measured values. When the primary particles were not perfectly spherical, the longest diameters were measured as the diameters.

(2) Production of Negative Electrode

As an active material, amorphous carbon (non-graphitizable carbon) in the form of particles was used. In addition, PVdF was used as a binder. A composite for a negative electrode was prepared by mixing and kneading NMP as a solvent, a binder, and an active material. The binder was incorporated to be 7 mass %, and the active material was incorporated to be 93 mass %. The prepared composite for a negative electrode was applied to both sides of a copper foil (10 μm thick) to a coating weight (areal weight) after drying of 4.0 mg/cm² each side. After drying, roll pressing was performed, and vacuum drying was performed to remove moisture and the like. The thickness of the active material layer (one layer) was 35 μm. The density of the active material layer was 1.2 g/cm³.

(3) Separator

As a separator, a microporous membrane made of polyethylene having a thickness of 22 μm was used. The permeability of the microporous membrane made of polyethylene was 100 sec/100 cc.

(4) Preparation of Electrolyte Solution

As an electrolyte solution, one prepared by the following method was used. As a nonaqueous solvent, a solvent obtained by mixing one part by volume of each of propylene carbonate, dimethyl carbonate, and ethyl methyl carbonate was used. LiPF$_6$ was dissolved in this nonaqueous solvent to a salt concentration of 1 mol/L, thereby preparing an electrolyte solution.

(5) Disposition of Electrode Assembly in Case

Using the above positive electrode, the above negative electrode, the above electrolyte solution, the separator, and a case, a battery was produced by an ordinary method.

First, a sheet-shaped product formed of a layered body of the positive electrode, the negative electrode, and the separator therebetween was wound. The area of the overlapping part of the positive active material layer and the negative active material layer was 5,000 cm². Next, an electrode assembly formed by winding was disposed in a case body of a prismatic container can made of aluminum serving as a case. Subsequently, the positive electrode and the negative electrode were electrically connected to two external terminals, respectively. Further, a lid plate was attached to the case body. The above electrolyte solution was injected into the case from an electrolyte solution filling port formed in the lid plate of the case. Finally, the electrolyte solution filling port of the case was sealed, thereby hermetically closing the case.

Particle Size Frequency Distribution of Active Material of Positive Active Material Layer The active material layer of the positive electrode was removed from the produced battery. The removed active material layer was immersed in 50 or more times the weight of NMP and pretreated by ultrasonic dispersion for 30 minutes. As the measurement device, a laser diffraction particle size distribution analyzer ("SALD2200" by Shimadzu Corporation) was used, and the specialized application software DMS ver2 was used as the measurement control software. The specific measurement technique is as follows. Employing a scattering measurement mode, a wet cell, through which a dispersion liquid having a measurement sample (active material) dispersed therein circulated, was placed in an ultrasound environment for 2 minutes, then a laser beam was applied, and the diffused light distribution was obtained from the measurement sample. Then, the diffused light distribution was approximated by the log normal distribution, and, in the particle size frequency distribution (horizontal axis, sigma), within a range with the minimum set at 0.021 μm and the maximum set at 2,000 μm, the particle size corresponding to an accumulation of 50% (D50) was defined as the average particle size. In addition, the dispersion liquid may also contain a surfactant and SN Dispersant 7347-C (product name) or Triton X-100 (product name) as a dispersant.

Particle Size D1 at First Peak, Particle Size D2 at Second Peak

In the particle size frequency distribution, two peaks were present. The particle size at the maximum of the peak of the smaller particle size was defined as the particle size D1 at the first peak, and the particle size at the maximum of the peak of the larger particle size was defined as the particle size D2 at the second peak.

Proportion of Primary Particles in All Particles of Active Material (Proportion of Particles Having Particle Size Dx (Particle Size at Minimum Between Two Peaks) or Less In the above particle size frequency distribution, a minimum point was present between D1 and D2. The particle size at the minimum was defined as Dx. In the particle size frequency distribution, taking the sum of the values of all the measurement points as 100, the sum of the values of the measurement points at a particle size smaller than the particle size Dx was defined as the proportion of primary particles relative to all particles of the active material.

Test Examples 2 to 12

Lithium ion secondary batteries were produced in the same manner as in Test Example 1, except that the battery configuration was changed as shown in Table 1.

TABLE 1

|  |  | Proportion of primary particles /% | D1/Dp /— | Proportion of less than Dx = Proportion of primary particles /% | D2 /μm | Durability performance C2/C1 Threshold: 90 /% | High-rate input/ output performance Wx × W1 Threshold: 90 /% |
|---|---|---|---|---|---|---|---|
| Test Example | 1 | 25.9 | 1.3 | 25.9 | 3.7 | 96.9 | 100.0 |
|  | 2 | 5.2 | 1.7 | 5.2 | 4.2 | 98.9 | 92.6 |
|  | 3 | 10.4 | 1.4 | 10.4 | 3.9 | 98.6 | 95.3 |
|  | 4 | 34.7 | 1.1 | 34.7 | 3.6 | 95.4 | 100.7 |
|  | 5 | 39.8 | 0.6 | 39.8 | 3.4 | 92.7 | 102.9 |
|  | 6 | 2.8 | 2.3 | 2.8 | 4.5 | 99.3 | 86.8 |
|  | 7 | 45.1 | 0.5 | 45.1 | 3.1 | 86.1 | 101.0 |
|  | 8 | 15.1 | 1.3 | 15.1 | 5.8 | 97.6 | 83.9 |
|  | 9 | 12.4 | 1.6 | 12.4 | 7.3 | 98.5 | 74.5 |
|  | 10 | 23.9 | 0.8 | 23.9 | 1.7 | 67.1 | 104.2 |
|  | 11 | 34.1 | 0.4 | 34.1 | 4.6 | 69.9 | 92.7 |
|  | 12 | 9.9 | 2.2 | 9.9 | 4.0 | 84.8 | 778 |

<Evaluation of Durability Performance>

In a thermostat at 25° C., constant current constant voltage charge at a charge current of 5 A and 4.2 V was performed for 3 hours, and, after a pause for 10 minutes, constant current discharge at a discharge current of 5 A was performed to 2.4 V, thereby measuring the discharge capacity C1 [Ah] before the durability test of the battery. In a thermostat at 25° C., constant current constant voltage charge at a charge current of 5 A and 4.2 V was performed for 3 hours, and the battery was stored in an environment at 65° C. for 30 days and then maintained at 25° C. for 4 hours. Subsequently, in a thermostat at 25° C., constant current constant voltage charge at a charge current of 5 A and 4.2 V was performed for 3 hours, and, after a pause for 10 minutes, constant current discharge at a discharge current of 5 A was performed to 2.4 V, thereby measuring the discharge capacity C2 [Ah] after the durability test of the battery. Using the above C1 and C2, C2/C1×100 [%] was calculated, and the resulting value was defined as durability performance.

<Evaluation of High-Rate Input/Output Performance>

In a thermostat at 25° C., constant current discharge at a discharge current of 5 A was performed to 2.4 V. Subsequently, constant current charge at a current value of 5 A was performed to provide an amount of electricity equivalent to 50% of the above discharge capacity C1, and, after a pause for 10 minutes, the open circuit voltage V1 was measured. The battery was then stored in a thermostat at −10° C. for 4 hours, constant current discharge at a discharge current of 25 A was performed for 10 seconds, and the closed circuit voltage V2 10 seconds after the passage of current was measured. Then, constant current discharge at a discharge current of 5 A was performed for 50 seconds. After a pause for 10 minutes, constant current charge at a charge current of 25 A was performed for 10 seconds, and the closed circuit voltage V3 10 seconds after the passage of current was measured. Using the above V1, V2, and V3, the direct current resistance R [Ω] was calculated by the least-squares method where the voltage at a current value of −5 [A] was V2, the voltage at a current value of 0 [A] was V1, and the voltage at a current value of 5 [A] was V3, and the inverse 1/R of the resulting value, W, was used as the index of high-rate input/output performance. Table 1 shows the value of W in each example (Wx), together with the ratio relative to the value of W in Test Example 1 (W1), that is, Wx/W1× 100 [%].

In the batteries having the predetermined configuration of the present embodiment, both durability performance and high-rate input/output performance were sufficiently exerted. Meanwhile, none of other batteries exerted sufficient durability performance and high-rate input/output performance at the same time.

DESCRIPTION OF REFERENCE SIGNS

1: Energy storage device (Nonaqueous electrolyte secondary battery),
2: Electrode assembly,
26: Non-covered layered part,
3: Case, 31: Case body, 32: Lid plate,
4: Separator, 5: Current collector, 50: Clip member,
6: Insulating cover,
7: External terminal, 71: Surface,
11: Positive electrode,
111: Metal foil of positive electrode (Positive electrode substrate), 112: Positive active material layer, 113: Electrically conductive layer,
12: Negative electrode,
121: Metal foil of negative electrode (Negative electrode substrate), 122: Negative active material layer,
91: Bus bar member,
100: Energy storage apparatus.

The invention claimed is:

1. An energy storage device comprising a positive electrode having a positive active material layer containing an active material in a form of particles, wherein
    the positive active material layer contains primary particles of the active material and secondary particles formed by aggregation of a plurality of the primary particles,
    a volume-based particle size frequency distribution of a total of the active material contained in the positive active material layer after being pressed has a first peak and a second peak that appears on a particle size larger than a particle size at the first peak,
    in the particle size frequency distribution, when a particle size having a minimum frequency between the first peak and the second peak is expressed as Dx, a proportion of particles having the particle size Dx or less relative to all particles of the active material is 5% or more and 40% or less, and
    an average size Dp of the primary particles and a particle size D1 at the first peak satisfy a relational expression 0.5 D1/Dp≤2.

2. The energy storage device according to claim 1, wherein a particle size D2 at the second peak is 2 μm or more and 5 μm or less.

3. The energy storage device according to claim 1, wherein a proportion of the primary particles relative to all particles of the active material contained in the positive active material layer is 5% or more and 40% or less.

* * * * *